H. A. W. SMITH.
SHEARS.
APPLICATION FILED MAY 26, 1916.
1,227,333.
Patented May 22, 1917.
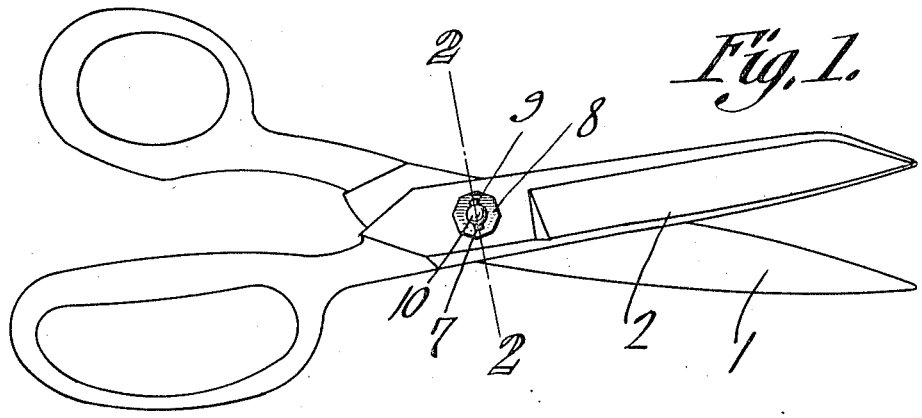
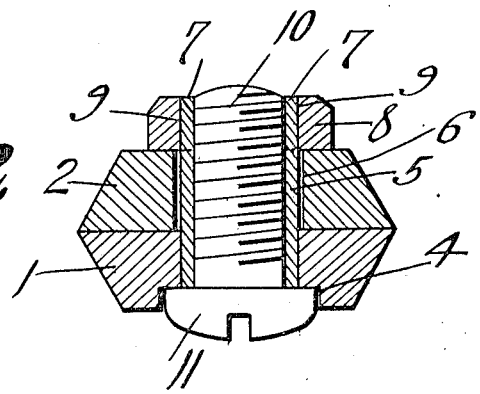
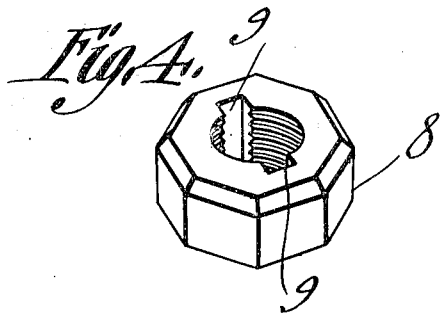
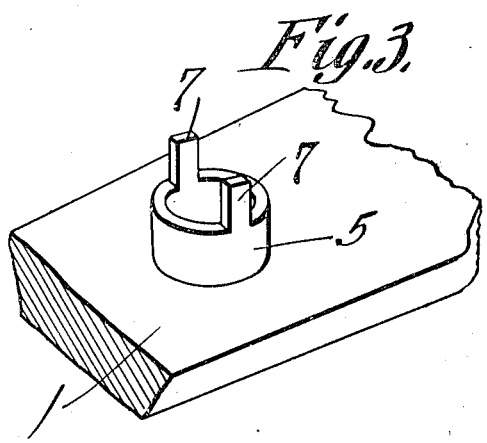
H. A. W. Smith
Inventor
Witnesses
by
Attorneys

UNITED STATES PATENT OFFICE.

HENRY A. W. SMITH, OF CHATHAM, VIRGINIA.

SHEARS.

1,227,333. Specification of Letters Patent. Patented May 22, 1917.

Application filed May 26, 1916. Serial No. 100,079.

*To all whom it may concern:*

Be it known that I, HENRY A. W. SMITH, a citizen of the United States, residing at Chatham, in the county of Pittsylvania and State of Virginia, have invented a new and useful Shears, of which the following is a specification.

The present invention appertains to shears, scissors, and kindred implements, and aims to provide a novel and improved pivot joint for the blades, whereby the blades can be readily assembled and separated, will be firmly held in proper operative position relative to one another, and will not become loosened or detached accidentally.

It is the object of the present invention to provide an extremely simple joint for the blades of shears, scissors, and similar implements, embodying a bolt for adjusting the tension between the blades, and novel means for accommodating the bolt and for preventing the bolt and nut from unscrewing relative to one another during the operation of the implement.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of a pair of shears equipped with the present joint.

Fig. 2 is an enlarged cross section taken on the line 2—2 of Fig. 1.

Fig. 3 is a fragmental perspective view of one blade showing the pivot sleeve or boss.

Fig. 4 is a perspective view of the nut.

The shears or implement illustrated embodies the crossed blades 1 and 2, the blade 1 of which is provided at the point of intersection of the blades with an aperture or bore 3 and a counter bore or socket 4 at the outer end of the aperture 3. A sleeve 5 has one end portion fitted or secured tightly within the aperture 3 flush with the bottom surface of the socket 4, and said sleeve 5 projects from the inner surface of the blade 1 to provide a boss fitting within the aperture 6 of the blade 2, whereby to pivotally connect the blades in a substantial manner, the sleeve or boss 5 being of sufficiently large diameter for this purpose. The free end of the sleeve or boss 5 is provided with diametrically opposite longitudinally projecting lugs or tongues 7 parallel with one another, for holding the nut 8 against rotation relative to the blade 1, said nut being adapted to rest against the outer side of the blade 2. The nut 8 is provided with diametrically opposite longitudinal notches or slots 9 snugly receiving the lugs 7, whereby to prevent the relative rotation between the sleeve 5 and nut 8, when the shears is operated.

The clamping bolt 10 fits snugly within the sleeve 5 and its tip is threaded within the threaded aperture of the nut 8, while the head 11 of the bolt seats within the socket 4. The head 11 of the bolt thus seats against the blade 1, while the nut 8 seats against the remote surface of the blade 2, to hold the two blades assembled, and by tightening or loosening the bolt, the tension between the blades can be increased or decreased, as desired. The bolt 10 in fitting within the sleeve 5, and the nut 8 being held against rotation by said sleeve, prevents the bolt or nut being loosened accidentally. There is no tendency for the bolt 10 being rotated relative to the blade 1, and the tendency for the blade 2 to rotate the nut 8 is resisted by the sleeve 5 with which the nut is engaged. The sleeve 5 provides both a pivot for the blade 2, and a receptacle for the bolt 10 and also has the function of preventing the rotation of the nut 8, whereby to provide an extremely simple yet thoroughly effective joint for the blades. In attaching the blades, the blade 2 is slipped onto the sleeve 5, and the nut 8 is then slipped onto the lugs 7 of the sleeve, after which the bolt 10 is introduced in the sleeve 5 and threaded into the nut 8, the threads of said nut being exposed between the lugs 7 for the engagement of the bolt.

Having thus described the invention, what is claimed as new is:

An implement embodying a pair of blades, one having a sleeve projecting therefrom, the other blade being mounted for rotation upon said sleeve, the free end of the sleeve being substantially flush with the outer face of the second mentioned blade and having a plurality of lugs projecting therefrom, a nut bearing against the outer face of the second mentioned blade and having a plurality of notches at its aperture receiving said lugs to hold and center the nut, and a bolt extending snugly through said sleeve and threadedly engaging the nut between the lugs.

In testimony that I claim the foregoing as my own, I have hereto affixed my signature in the presence of two witnesses.

HENRY A. W. SMITH.

Witnesses:
ZACHARY ADKINS,
J. L. CARTER.